(12) United States Patent
Mori et al.

(10) Patent No.: US 11,881,187 B2
(45) Date of Patent: Jan. 23, 2024

(54) POLYMER DISPERSION TYPE LIQUID CRYSTAL DEVICE, AND METHOD OF DRIVING POLYMER DISPERSION TYPE LIQUID CRYSTAL PANEL

(71) Applicant: Nitto Denko Corporation, Ibaraki (JP)

(72) Inventors: Shigeyasu Mori, Ibaraki (JP); Yoshihiro Onishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/436,034

(22) PCT Filed: Mar. 4, 2020

(86) PCT No.: PCT/JP2020/009145
§ 371 (c)(1),
(2) Date: Sep. 2, 2021

(87) PCT Pub. No.: WO2020/184331
PCT Pub. Date: Sep. 17, 2020

(65) Prior Publication Data
US 2022/0005429 A1    Jan. 6, 2022

(30) Foreign Application Priority Data
Mar. 8, 2019    (JP) .................................. 2019-042358

(51) Int. Cl.
*G09G 3/36* (2006.01)
*G02F 1/133* (2006.01)
(Continued)

(52) U.S. Cl.
CPC ........... *G09G 3/3614* (2013.01); *G02F 1/137* (2013.01); *G02F 1/1334* (2013.01);
(Continued)

(58) Field of Classification Search
CPC .......... G09G 3/3614; G09G 2320/0247; G02F 1/13306; G02F 1/1334; G02F 1/13439; G02F 1/137; G02F 1/13452
See application file for complete search history.

(56) References Cited

U.S. PATENT DOCUMENTS

| | | | |
|---|---|---|---|
| 2003/0122753 A1* | 7/2003 | Park ..................... | G09G 3/3648 345/87 |
| 2011/0090183 A1 | 4/2011 | Yamazaki et al. | |

(Continued)

FOREIGN PATENT DOCUMENTS

| | | |
|---|---|---|
| CN | 102968973 A | 3/2013 |
| EP | 3570094 A1 | 11/2019 |

(Continued)

OTHER PUBLICATIONS

International Search Report issued for corresponding International Patent Application No. PCT/JP2020/009145 dated Apr. 14, 2020, along with an English translation.

(Continued)

*Primary Examiner* — Pegeman Karimi
(74) *Attorney, Agent, or Firm* — HAUPTMAN HAM, LLP (57) ABSTRACT

A polymer dispersion type liquid crystal device includes a pair of transparent substrates; a pair of transparent electrodes provided between the pair of transparent substrates; a liquid crystal layer formed by filling a polymer dispersion type liquid crystal between the pair of transparent electrodes; and a driving circuit that applies a voltage between the pair of transparent electrodes to set the liquid crystal layer to a non-scattering state or a scattering state. The driving circuit applies a direct current voltage that periodically inverts a polarity between the pair of transparent electrodes.

6 Claims, 10 Drawing Sheets

(51) Int. Cl.
*G02F 1/1334* (2006.01)
*G02F 1/1343* (2006.01)
*G02F 1/137* (2006.01)

(52) U.S. Cl.
CPC ...... *G02F 1/13306* (2013.01); *G02F 1/13439* (2013.01); *G09G 2320/0247* (2013.01)

(56) References Cited

U.S. PATENT DOCUMENTS

| 2015/0332651 | A1* | 11/2015 | Miyazawa | G09G 3/3614 345/211 |
| 2017/0160458 | A1* | 6/2017 | Asakawa | G02F 1/133553 |
| 2019/0355319 | A1* | 11/2019 | Yatabe | G09G 3/3614 |
| 2021/0335312 | A1* | 10/2021 | Tomitani | G09G 3/3677 |

FOREIGN PATENT DOCUMENTS

| JP | 2003-185996 A | 7/2003 |
| JP | 2007-156218 A | 6/2007 |
| JP | 2013-54366 A | 3/2013 |
| JP | 2013-257522 A | 12/2013 |
| JP | 2018-116273 A | 7/2018 |
| TW | 201730649 A | 9/2017 |

OTHER PUBLICATIONS

Written Opinion issued for corresponding International Patent Application No. PCT/JP2020/009145 dated Apr. 14, 2020.
Office Action dated Aug. 23, 2022, for corresponding Japanese Patent Application No. 2019-042358, along with an English translation (6 pages).
Office Action dated Mar. 22, 2023 for corresponding Japanese Patent Application No. 2019-042358, along with an English translation (6 pages).
Office Action dated Oct. 26, 2023 for corresponding Taiwanese Patent Application No. 109107423, along with an English translation (9 pages).

* cited by examiner

POLYMER DISPERSION TYPE LIQUID CRYSTAL DEVICE, AND METHOD OF DRIVING POLYMER DISPERSION TYPE LIQUID CRYSTAL PANEL

CROSS REFERENCE TO RELATED APPLICATION

This application is a National Stage of International Application No. PCT/JP2020/009145, filed on Mar. 4, 2020, which designates the United States and was published in Japan, and which is based upon and claims priority to Japanese Patent Application No. 2019-042358, filed on Mar. 8, 2019 in the Japan Patent Office. All of the aforementioned applications are hereby incorporated by reference in their entireties.

FIELD OF THE INVENTION

The disclosure relates to a polymer dispersion type liquid crystal device and a method of driving a polymer dispersion type liquid crystal panel.

BACKGROUND ART

Conventionally, polymer dispersion type liquid crystal panels each configured by having a liquid crystal layer in which a polymer dispersion type liquid crystal is filled between a pair of transparent electrodes have been known (See, for example, patent document 1).

In the polymer dispersion type liquid crystal panel, in a state where an alternating current is not applied to the pair of transparent electrodes, liquid crystal molecules are arranged irregularly, i.e. the liquid crystal panel is in a state in which light is scattered (scattering state). According to this property, it is possible to make the entire polymer dispersion type liquid crystal panel be white, and it is possible to make the panel invisible from one side of the panel to the other side. On the other hand, when an alternating current is applied to the pair of transparent electrodes, the liquid crystal molecules contained in the polymer dispersion type liquid crystal are arranged regularly, and the liquid crystal panel becomes a state in which light is transmitted through the panel (non-scattering state).

The above-described polymer dispersion type liquid crystal panel can be made into a form of film, and the polymer dispersion type liquid crystal panel is used as a dimming film. For example, the polymer dispersion type liquid crystal panel can function as a blind shutter when the liquid crystal panel is attached to an existing window glass.

RELATED ART DOCUMENT

Patent Literature

Patent document 1: Japanese Unexamined Patent Application No. 2018-116273

SUMMARY OF THE INVENTION

Problem to be Solved by the Invention

Conventional polymer dispersion type liquid crystal devices can be driven by commercial alternating current (AC) power supplies that can be easily used in homes, offices, and the like. However, there is a problem that a power consumption in the driving by the commercial AC power supply is large due to a short frequency and an environmental load is large. In addition, there is a problem that because the frequency of the commercial AC power supply varies depending on the region, voltage is not stable.

The present invention aims at providing a polymer dispersion type liquid crystal device and a method of driving a polymer dispersion type liquid crystal panel that have a low power consumption and are capable of being driven stably.

Means for Solving the Problem

In order to solve the above-described problem, a polymer dispersion type liquid crystal device according to the present invention includes a pair of transparent substrates; a pair of transparent electrodes provided between the pair of transparent substrates; a liquid crystal layer formed by filling a polymer dispersion type liquid crystal between the pair of transparent electrodes; and a driving circuit that applies a voltage between the pair of transparent electrodes to set the liquid crystal layer to a non-scattering state or a scattering state, characterized in that the driving circuit applies a direct current voltage that periodically inverts a polarity between the pair of transparent electrodes.

Effects of the Invention

According to the present invention, driving with a low power consumption and stability is enabled.

BRIEF DESCRIPTION OF DRAWINGS

FIG. 8 is a diagram illustrating an example of waveforms of a driving voltage and the like.

MODE FOR CARRYING OUT THE INVENTION

In the following, an embodiment of the present invention will be described with reference to the drawings. In addition, in the present embodiment, for convenience, when a polymer dispersion type liquid crystal device 10 is viewed from a front side, a width direction is set to an X-axis direction, a depth direction is set to a Y-axis direction and a height direction is set to a Z-axis direction.

(Configuration of the Polymer Dispersion Type Liquid Crystal Device 10)

Figure 1:
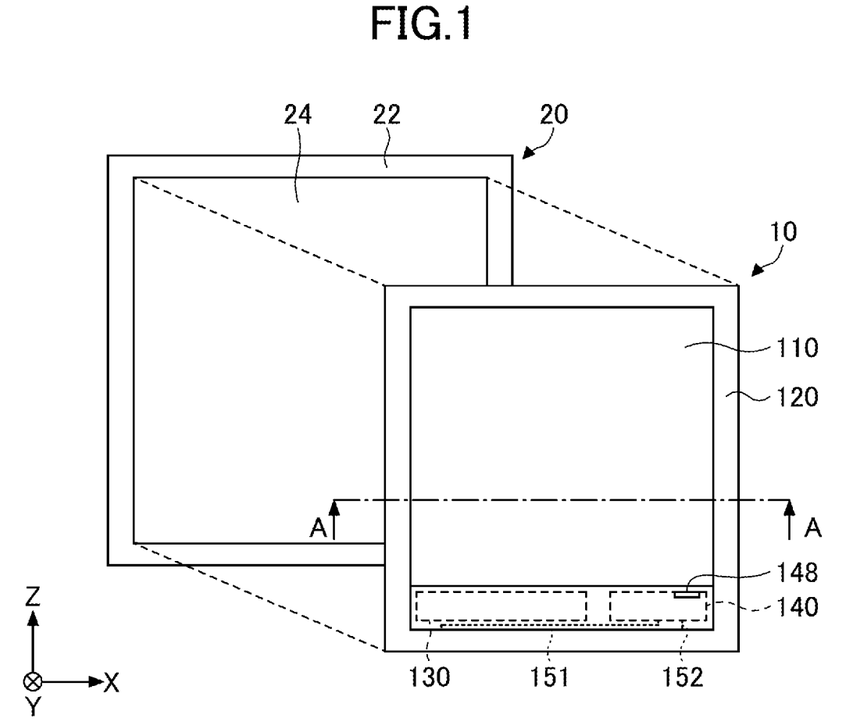
FIG. 1 is a front view of a polymer dispersion type liquid crystal device according to an embodiment of the present invention.

FIG. 1 is a front view of the polymer dispersion type liquid crystal device 10 according to the embodiment of the present invention. The polymer dispersion type liquid crystal device 10 shown in FIG. 1 is a device with a flat shape and a rectangular shape. The polymer dispersion type liquid crystal device 10 has a transparent polymer dispersion type liquid crystal panel 110 with a rectangular shape, and can switch between a state in which light is transmitted through the panel (hereinafter referred to as a non-scattering state) and a state in which light is scattered (hereinafter referred to as a scattering state) by driving the polymer dispersion type liquid crystal panel 110. When the polymer dispersion type liquid crystal device 10 is attached to a window 20, the polymer dispersion type liquid crystal device 10 functions a blind shutter for the window 20.

As shown in FIG. 1, the polymer dispersion type liquid crystal device 10 is provided with the polymer dispersion type liquid crystal panel 110, a frame 120, a battery 130, and a driving circuit 140.

The polymer dispersion type liquid crystal panel 110 is a member having a flat shape and a rectangular shape. The light transmission characteristic of the polymer dispersion type liquid crystal panel 110 is switched between the non-scattering state and the scattering state by the driving circuit 140.

For example, when a driving voltage is applied from the driving circuit 140, liquid crystal molecules contained in a polymer dispersion type liquid crystal are arranged regularly, and the polymer dispersion type liquid crystal panel 110 becomes in the non-scattering state in which light is transmitted through the panel. On the other hand, when the driving voltage is not applied from the driving circuit 140, the liquid crystal molecules are arranged irregularly, and the polymer dispersion type liquid crystal panel 110 becomes in the scattering state in which light is scattered. The entire polymer dispersion type liquid crystal panel 110 is whitened in the state in which light is scattered. From one side of the polymer dispersion type liquid crystal panel 110 in the scattering state, it is not possible to visually recognize the other side through the panel in the depth direction (Y-axis direction in the drawing).

The frame 120 is a frame-like member provided along an outer periphery of the polymer dispersion type liquid crystal panel 110 (i.e. four sides of the polymer dispersion type liquid crystal panel 110) with a predetermined width and a predetermined thickness. An external dimension of the frame 120 is approximately the same as an internal dimension of a sash 22 as a window frame provided in the window 20. According to the above-described property, the polymer dispersion type liquid crystal device 10 can be easily attached to the window 20 in a state where the polymer dispersion type liquid crystal device 10 overlaps with a window glass 24 provided in the window 20 by fitting the polymer dispersion type liquid crystal device 10 inside the sash 22.

The battery 130 supplies a direct current (DC) voltage to the driving circuit 140. Suitable batteries 130 may include, for example, various types of secondary batteries (e.g. lithium ion batteries, or lithium polymer batteries).

In the case where the polymer dispersion type liquid crystal panel 110 becomes in the non-scattering state, the driving circuit 140 generates a driving voltage. Specifically, the driving circuit 140 generates a DC driving voltage that is, based on the voltage generated by the battery 130, higher than the voltage generated by the battery 130, and changes a polarity periodically. The driving circuit 140 drives the polymer dispersion type liquid crystal panel 110 by applying the generated driving voltage between a pair of transparent electrodes 112 and 114, which will be described later. When the driving voltage is applied by the driving circuit 140, the polymer dispersion type liquid crystal panel 110 is switched from the scattering state to the non-scattering state. The driving circuit 140 has a connection terminal 148 to which a charging cable is connected. The battery 130 is charged by electric power supplied from the charging cable via the connection terminal 148.

Figure 2:
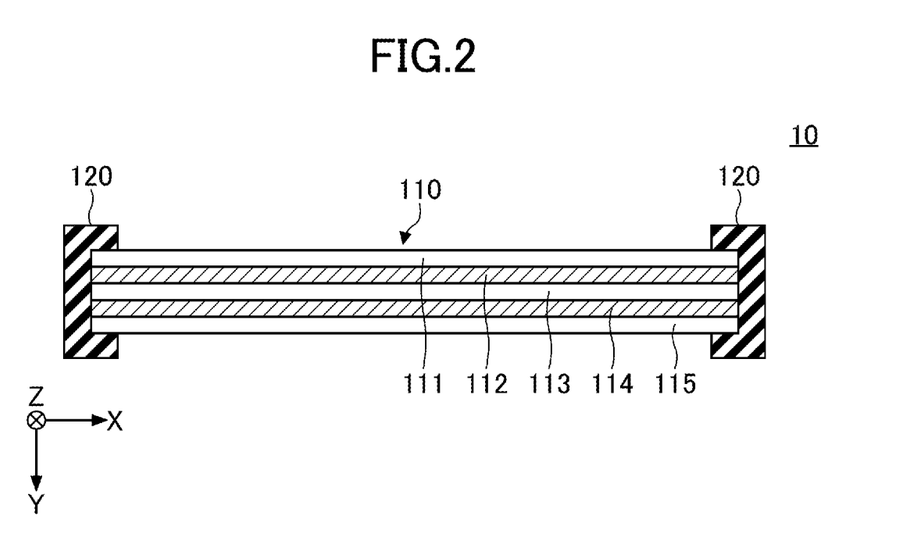
FIG. 2 is an A-A cross-sectional view of the polymer dispersion type liquid crystal device shown in FIG. 1.

FIG. 2 is an A-A cross-sectional view of the polymer dispersion type liquid crystal device 10 shown in FIG. 1. As shown in FIG. 2, the polymer dispersion type liquid crystal panel 110 has a laminated structure in which a plurality of planar configuration members are laminated. Moreover, an outer periphery of the polymer dispersion type liquid crystal panel 110 is held by the frame 120.

Specifically, the polymer dispersion type liquid crystal panel 110 has a transparent substrate 111, a transparent electrode 112, a liquid crystal layer 113, a transparent electrode 114, and a transparent substrate 115 in this order from the front side (negative side of the Y-axis in the drawing), and has a laminated structure in which the above-described configuration members 111 to 115 are laminated.

The pair of transparent substrates 111 and 115 are transparent planar members having rectangular shapes in the plane view from the front side (negative side of the Y-axis in the drawing). The transparent substrate 111 is arranged on a foremost surface of the polymer dispersion type liquid crystal panel 110. The transparent substrate 115 is arranged on a rearmost surface of the polymer dispersion type liquid crystal panel 110. As the transparent substrates 111 and 115, for example, polyethylene terephthalate (PET) resin plates, or glass plates may be used.

The pair of transparent electrodes 112 and 114 are transparent thin films having electrical conductivity. The transparent electrode 112 is arranged between the transparent substrate 111 and the transparent substrate 115 so as to overlap with the transparent substrate 111. The transparent electrode 114 is arranged between the transparent substrate 111 and the transparent substrate 115 so as to overlap with the transparent substrate 115. The transparent electrode 112 is electrically connected to the driving circuit 140 via a wiring 151 (See FIG. 1). The transparent electrode 114 is electrically connected to the driving circuit 140 via a wiring 152 (See FIG. 1). According to the above-described configuration, to the transparent electrodes 112 and 114, the driving voltage is applied from the driving circuit 140 via the wirings 151 and 152. As the transparent electrodes 112 and 114, for example, indium tin oxide (ITO) can be used.

The liquid crystal layer 113 is a member formed between the transparent electrode 112 and the transparent electrode 114. The liquid crystal layer 113 is formed by filling a polymer dispersion type liquid crystal between the transparent electrode 112 and the transparent electrode 114. The liquid crystal layer 113 is in the scattering state when the driving voltage is not applied between the transparent electrodes 112 and 114. When the driving voltage is applied between the transparent electrodes 112 and 114, the liquid crystal layer is in the non-scattering state.

(Configuration of the Polymer Dispersion Type Liquid Crystal Panel 110)

Figure 3:
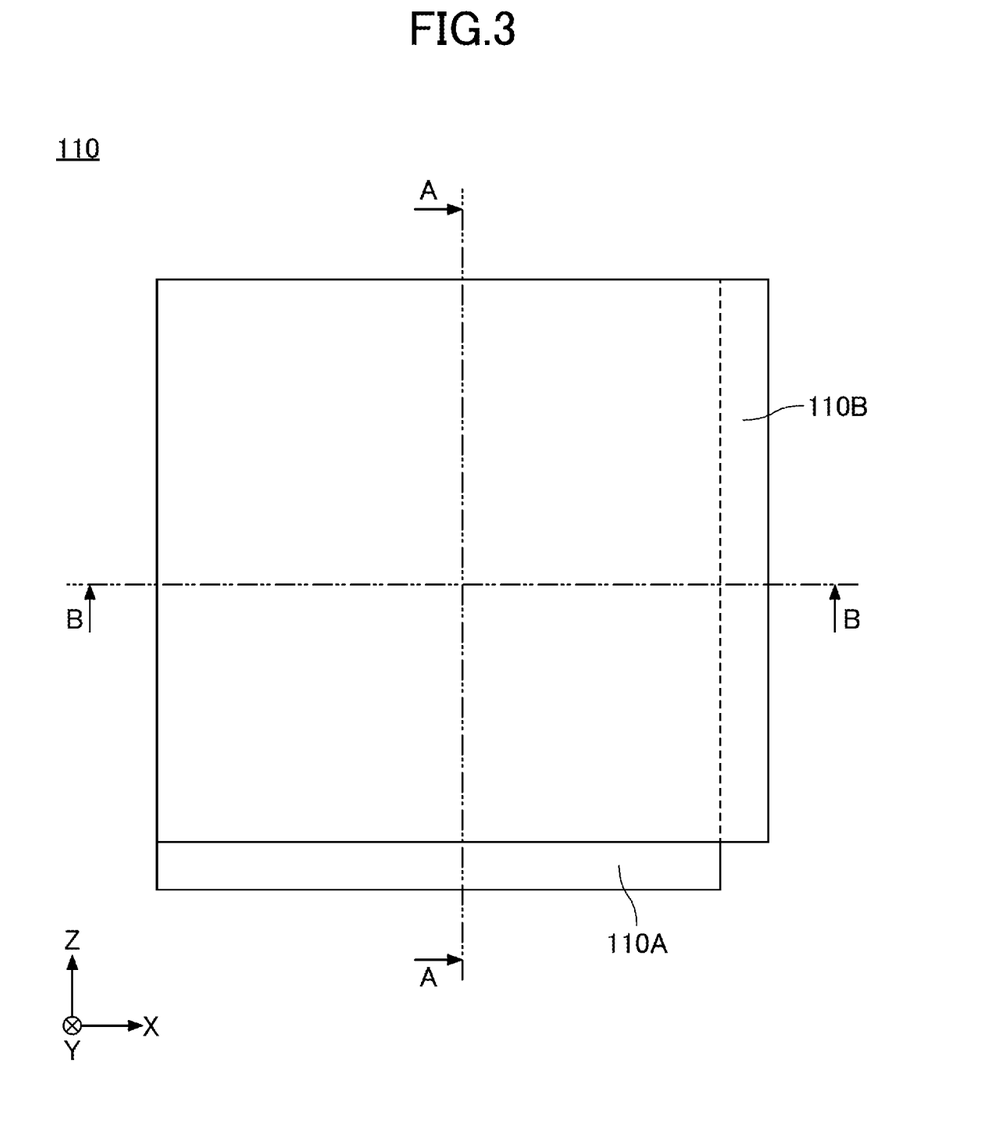
FIG. 3 is a front view of a polymer dispersion type liquid crystal panel according to the embodiment of the present invention.
Figure 4:
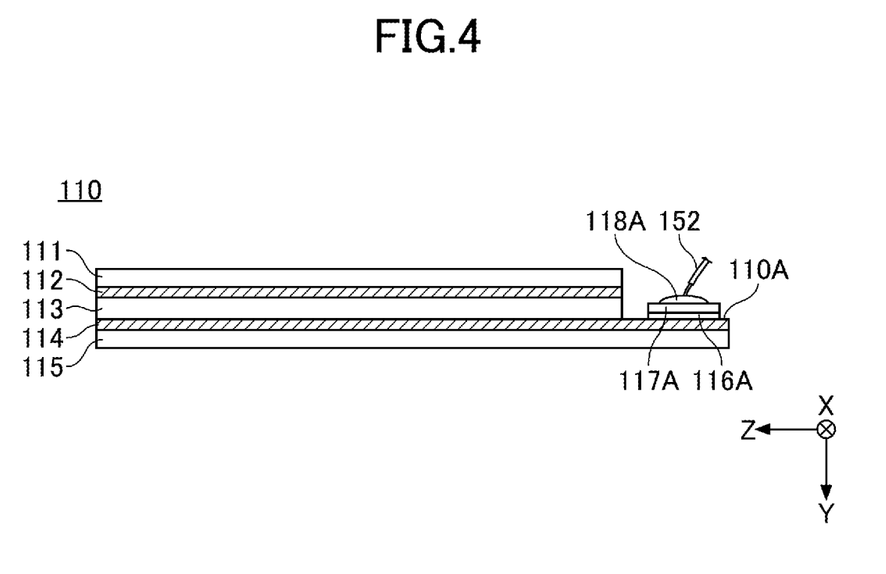
FIG. 4 is an A-A cross-sectional view of the polymer dispersion type liquid crystal panel shown in FIG. 3.
Figure 5:
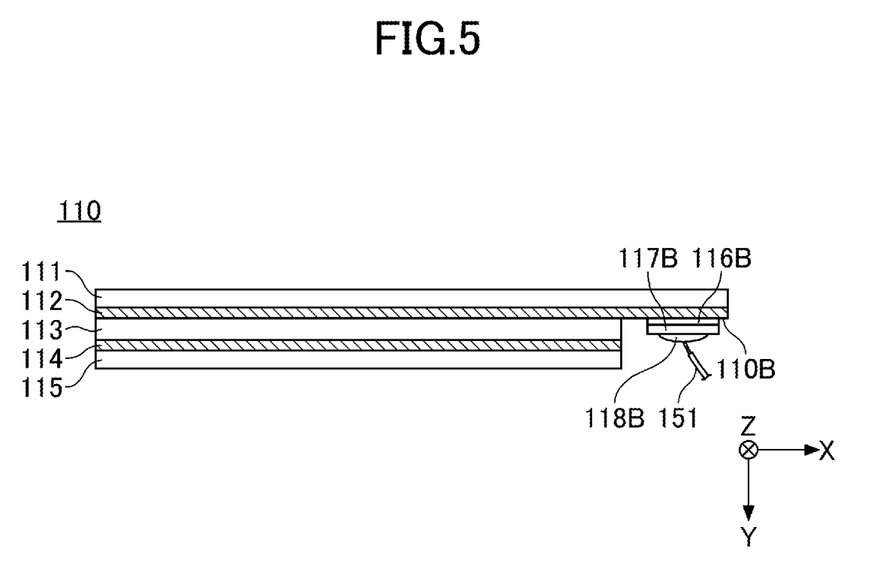
FIG. 5 is a B-B cross-sectional view of the polymer dispersion type liquid crystal panel shown in FIG. 3.

Next, with reference to FIGS. 3 to 5, the configuration of the polymer dispersion type liquid crystal panel 110 will be described. FIG. 3 is a front view of the polymer dispersion type liquid crystal panel 110. FIG. 4 is an A-A cross-sectional view of the polymer dispersion type liquid crystal panel 110 shown in FIG. 3. FIG. 5 is a B-B cross-sectional view of the polymer dispersion type liquid crystal panel 110 shown in FIG. 3.

As shown in FIGS. 3 and 4, in the polymer dispersion type liquid crystal panel 110, on a left edge (edge on the negative side of the X-axis in the drawing) of the front side (negative side of the Y-axis in the drawing), a first exposure portion 110A is formed extending along the left edge with a predetermined width. The first exposure portion 110A is a part of the surface on the front side of the transparent electrode 114 that is exposed by partially removing the transparent substrate 111, the transparent electrode 112 and the liquid crystal layer 113.

As shown in FIG. 4, a copper foil layer 117A is formed on the surface of the transparent electrode 114 in the first exposure portion 110A, via a silver paste layer 116A. To the copper foil 117A, one end of the wiring 152 composed of lead wires is connected via solder 118A. The other end of the wiring 152 is connected to the driving circuit 140.

Moreover, as shown in FIG. 3 and FIG. 5, in the polymer dispersion type liquid crystal panel 110, on a lower edge (edge on the negative side of the Z-axis in the drawing) of the rear side (positive side of the Y-axis in the drawing), a second exposure portion 110B is formed extending along the left edge with a predetermined width. The second exposure portion 110B is a part of the surface on the rear side of the transparent electrode 112 that is exposed by partially removing the liquid crystal layer 113, the transparent electrode 114, and the transparent substrate 115.

As shown in FIG. 5, a copper foil layer 117B is formed on the surface of the transparent electrode 112 in the second exposure portion 110B, via a silver paste layer 116B. To the copper foil 117B, one end of the wiring 151 composed of lead wires is connected via solder 118B. The other end of the wiring 151 is connected to the driving circuit 140.

(Configuration of the Driving Circuit 140)

Figure 6:
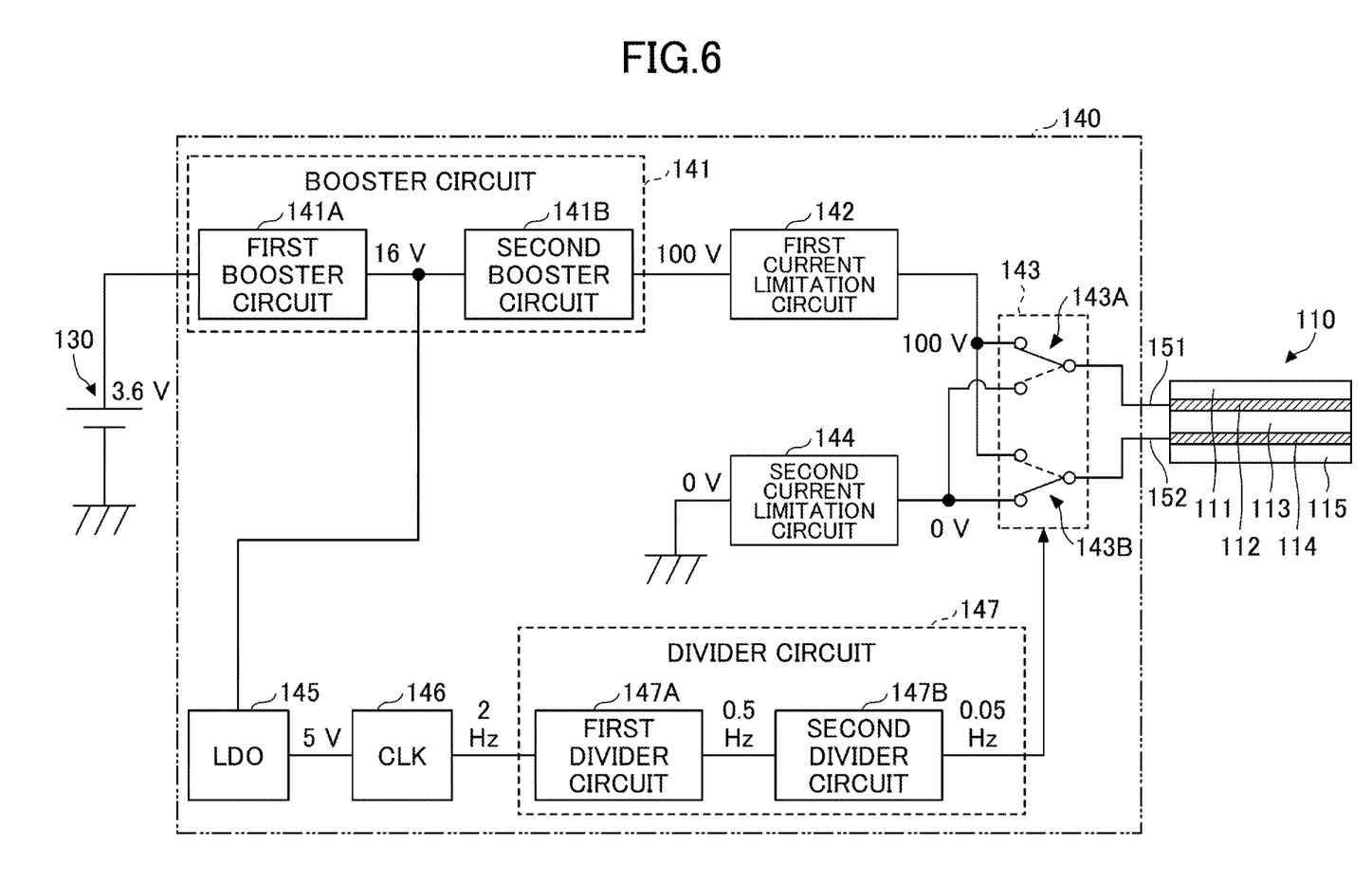
FIG. 6 is a diagram depicting an example of a configuration of a driving circuit.

Next, a configuration of the driving circuit 140 will be described with reference to FIG. 6. FIG. 6 is a diagram depicting an example of a configuration of the driving circuit 140.

As shown in FIG. 6, the driving circuit 140 includes a booster circuit 141, a first current limitation circuit 142, a switching circuit 143, a second current limitation circuit 144, a low drop-out regulator (LDO) 145, a clock circuit (CLK) 146, and a divider circuit 147.

The booster circuit 141 includes a first booster circuit 141A and a second booster circuit 141B. Each of the first booster circuit 141A and second booster circuit 141B is configured by a charge pump that increases (boosts) voltage by combining a capacitor and a switch.

The first booster circuit 141A is connected to the battery 130, and increases a DC voltage generated by the battery 130. For example, when the battery 130 generates a DC voltage of 3.6 V, the first booster circuit 141A boosts the DC voltage of 3.6 V to a DC voltage of 16 V. The second booster circuit 141B is connected to a post stage of the first booster circuit 141A, and further boosts the DC voltage that is boosted by the first booster circuit 141A. For example, the second booster circuit 141B boosts the DC voltage of 16 V output from the first booster circuit 141A to a DC voltage of 100 V. Thus, for example, a DC voltage of 100 V is output from the booster circuit 141.

The booster circuit 141 is connected to the transparent electrode 112 or the transparent electrode 114 of the polymer dispersion type liquid crystal panel 110 via the first current limitation circuit 142 and the switching circuit 143. The first current limitation circuit 142 is connected to the post stage of the booster circuit 141. The first current limitation circuit 142 is a circuit that limits a current flowing in the transparent electrode 112 or the transparent electrode 114, as a load, to a predetermined current value or lower. For example, the first current limitation circuit 142 limits the current flowing in the transparent electrode 112 or the transparent electrode 114 to 100 mA or lower.

The second current limitation circuit 144 is connected to the transparent electrode 112 or the transparent electrode 114 of the polymer dispersion type liquid crystal panel 110 via the switching circuit 143. The second current limitation circuit 144 is connected to ground. The second current limitation circuit 144 is a circuit that limits a current flowing in the transparent electrode 112 or the transparent electrode 114, as a load, to a predetermined current value or lower. For example, the second current limitation circuit 144 limits the current flowing in the transparent electrode 112 or the transparent electrode 114 to 100 mA or lower.

The switching circuit 143 has a first switch 143A and a second switch 143B. One end of the first switch 143A is connected to the transparent electrode 112 via the wiring 151. The other end of the first switch 143A is connected to the first current limitation circuit 142 or the second current limitation circuit 144 according to a switching signal which will be described later. One end of the second switch 143B is connected to the transparent electrode 114 via the wiring 152. The other end of the second switch 143B is connected to the first current limitation circuit 142 or the second current limitation circuit 144 according to the switching signal which will be described later.

The LDO 145 is a linear regulator, in which the minimum potential difference required between the input and the output is low. An output voltage (e.g. 16 V) from the first booster circuit 141A included in the booster circuit 141 is input as an input voltage to the LDO 145. The LDO 145 causes the input voltage to decrease (dropout) to produce a stable output voltage lower than the input voltage (e.g. 5 V).

The CLK 146 is connected to a post stage of the LDO 145. The CLK 146 has an oscillation circuit and generates a reference clock signal having a rectangular waveform based on the output voltage from the LDO 145. A frequency of the reference clock signal generated by the CLK 146 (clock frequency) is, for example, 2 Hz.

The divider circuit 147 includes a first divider circuit 147A and a second divider circuit 147B. Each of the first divider circuit 147A and the second divider circuit 147B is a frequency conversion circuit that reduces a frequency of an input signal by a factor of an integer.

The first divider circuit 147A is connected to a post stage of the CLK 146. The first divider circuit 147A is a ¼ divider circuit that reduces the frequency of the reference clock signal output from the CLK 146 by ¼ times, and outputs the clock signal. For example, when the frequency of the reference clock signal is 2 Hz, the first divider circuit 147A outputs a clock signal with a frequency of 0.5 Hz.

The second divider circuit 147B is connected to a post stage of the first divider circuit 147A. The second divider circuit 147B is a ¹⁄₁₀ divider circuit that reduces the frequency of the clock signal output from the first divider circuit 147A by 1/10 times, and outputs the clock signal. For example, when the frequency of the clock signal output from the first divider circuit 147A is 0.5 Hz, the second divider circuit 147B outputs a clock signal with a frequency of 0.05 Hz. The clock signal output from the second divider circuit 147B is input into the switching circuit 143, as a switching signal.

The switching circuit 143 switches a connection state of the first switch 143A and the second switch 143B between a first state expressed by solid lines shown in FIG. 6 and a second state expressed by dashed lines based on the switching signal input as above.

In the first state, the first switch 143A connects the wiring 151 to the first current limitation circuit 142 and the second switch 143B connects the wiring 152 to the second current limitation circuit 144. In the first state, a voltage of 100 V is applied to the transparent electrode 112, and the transparent electrode 114 is set to the ground level (0 V).

In the second state, the first switch 143A connects the wiring 151 to the second current limitation circuit 144 and the second switch 143B connects the wiring 152 to the first current limitation circuit 142. In the second state, a voltage of 100 V is applied to the transparent electrode 114, and the transparent electrode 112 is set to the ground level (0 V).

When the frequency of the switching signal is 0.5 Hz, the switching circuit 143 switches between the first state and the second state (polarity inversion) every 10 seconds.

(Configuration of the First Current Limitation Circuit 142)

Figure 7:
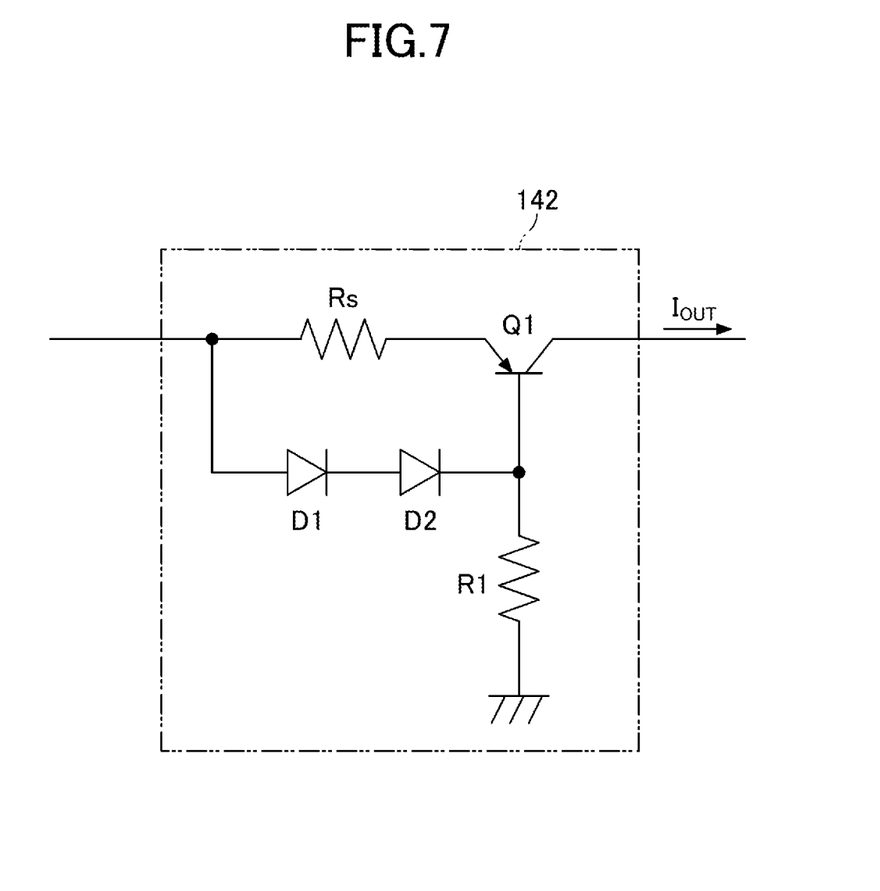
FIG. 7 is a diagram depicting an example of a configuration of a first current limitation circuit.

Next, configuration of the first current limitation circuit 142 will be described. FIG. 7 is a diagram depicting an example of the configuration of the first current limitation circuit 142.

As shown in FIG. 7, the first current limitation circuit 142 includes a pnp-type transistor Q1, a diode D1, a diode D2, a resistor R1, and a resistor Rs. One end of the resistor R1 is connected to a base terminal of the transistor Q1, and the other end of the resistor R1 is grounded. One end of the resistor Rs is connected to an emitter terminal of the transistor Q1.

The diode D1 and the diode D2 are connected in series. A cathode side terminal of the diode D2 is connected to the base terminal of the transistor Q1. An anode side terminal of the diode D1 is connected to the other end of the resistor Rs. In the first current limitation circuit 142, the other end of the resistor Rs is connected to the booster circuit 141, and a collector terminal of the transistor Q1 is connected to the switching circuit 143.

According to the configuration of the circuit according to the embodiment of the present application, an output current $I_{out}$ output from the first current limitation circuit 142 is limited to the maximum current value $I_{max}$ calculated by using the following formula (1).

$$I_{max} = V_{Df}/Rs \quad (1)$$

where $V_{Df}$ is a forward drop voltage of the diode D1 (about 0.6 V).

Thus, the maximum current value $I_{max}$ can be determined by selecting an appropriate resistance value of the resistor Rs. For example, in order to set the maximum current value $I_{max}$ to 100 mA, the resistor Rs of 6Ω will be used.

The configuration of the second current limitation circuit 144 is the same as the configuration of the first current limitation circuit 142 shown in FIG. 7, and the description thereof is omitted.

(Driving Voltage Waveform)

Figure 8:
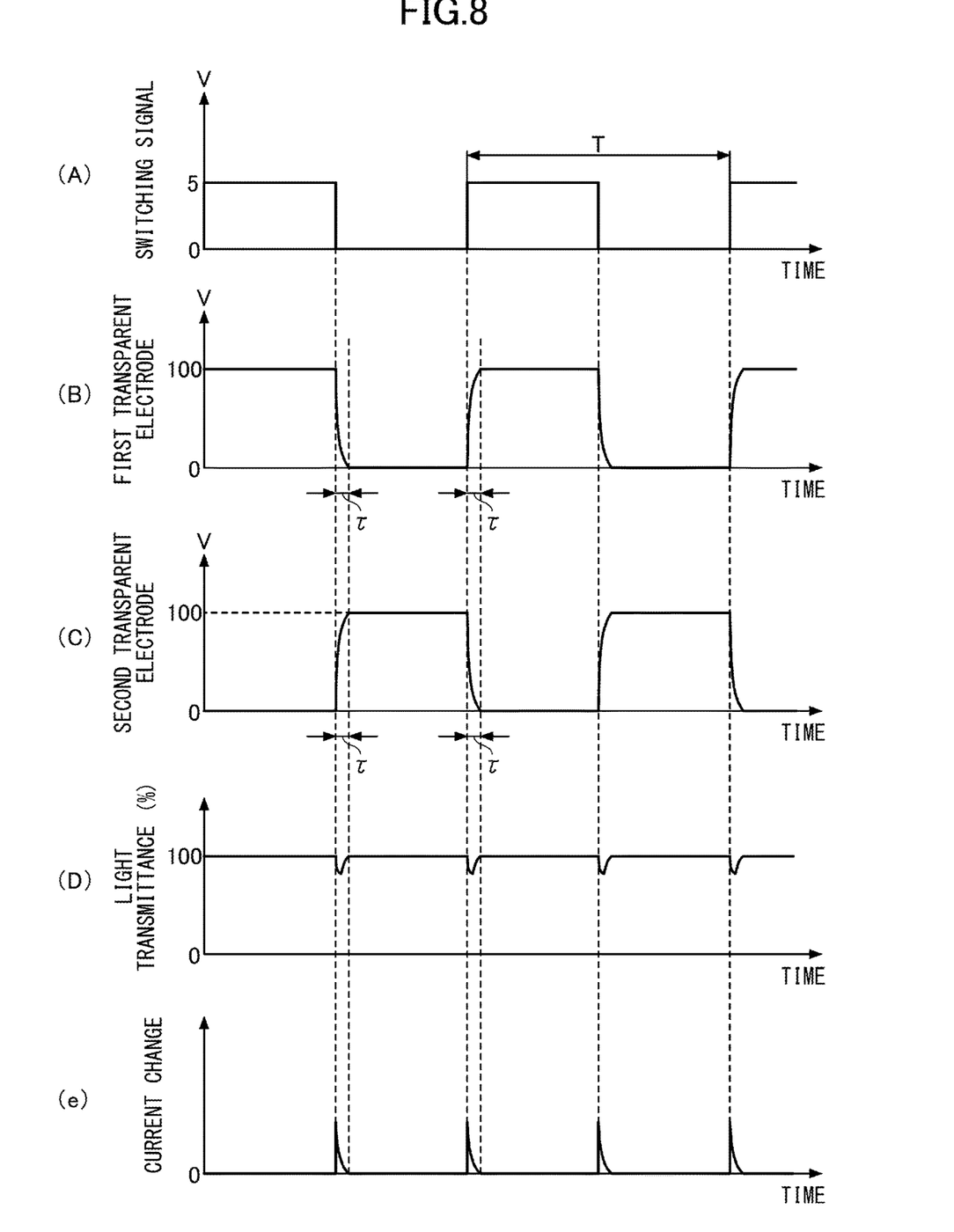

Next, a waveform of the driving voltage applied from the driving circuit 140 to the polymer dispersion type liquid crystal panel 110 will be described. FIG. 8 is a diagram illustrating an example of a waveform of the driving voltage or the like. FIG. 8(A) depicts an example of a waveform of the switching signal input to the switching circuit 143. FIG. 8(B) depicts an example of a waveform of a first driving voltage applied to the transparent electrode 112 as a first transparent electrode. FIG. 8(C) depicts an example of a waveform of a second driving voltage applied to the transparent electrode 114 as a second transparent electrode. FIG. 8(D) depicts an example of light transmittance of the polymer dispersion type liquid crystal panel 110. FIG. 8(E) depicts an example of a change in a current flowing in the first transparent electrode and the second transparent electrode.

As shown in FIG. 8(A), the above-described switching signal has a rectangular waveform having a predetermined period. As shown in FIGS. 8(B) and 8(C), each of the first driving voltage and the second driving voltage periodically inverts the polarity in response to rising and falling of the switching signal. The period of inverting polarity T is a half of the period of the switching signal.

In the following, a voltage transition time τ of the first driving voltage and the second driving voltage at the time of inverting the polarity is defined to be time from the beginning of the change in voltage to the arrival at the target value. The above-described voltage transition time T is mainly determined by a time constant according to a resistance component and a capacitance component contained in the first current limitation circuit 142 and the second current limitation circuit 144.

As shown in FIG. 8(D), in response to the polarity inversion of the first driving voltage and the second driving voltage, a flicker occurs due to a temporal decrease in the light transmittance of the polymer dispersion type liquid crystal panel 110. The smaller the voltage transition time τ is, the less conspicuous the flicker is. Moreover, the flicker can be quantitatively evaluated through a flicker rate R (%) expressed by the following formula (2).

$$R = [(L_{max} - L_{min})/(L_{max} + L_{min})] \times 100 \quad (2)$$

where $L_{max}$ and $L_{min}$ are the maximum value and the minimum value of luminance of transmitted light when the polymer dispersion type liquid crystal panel 110 is irradiated with light with predetermined luminance, respectively.

Figure 9:
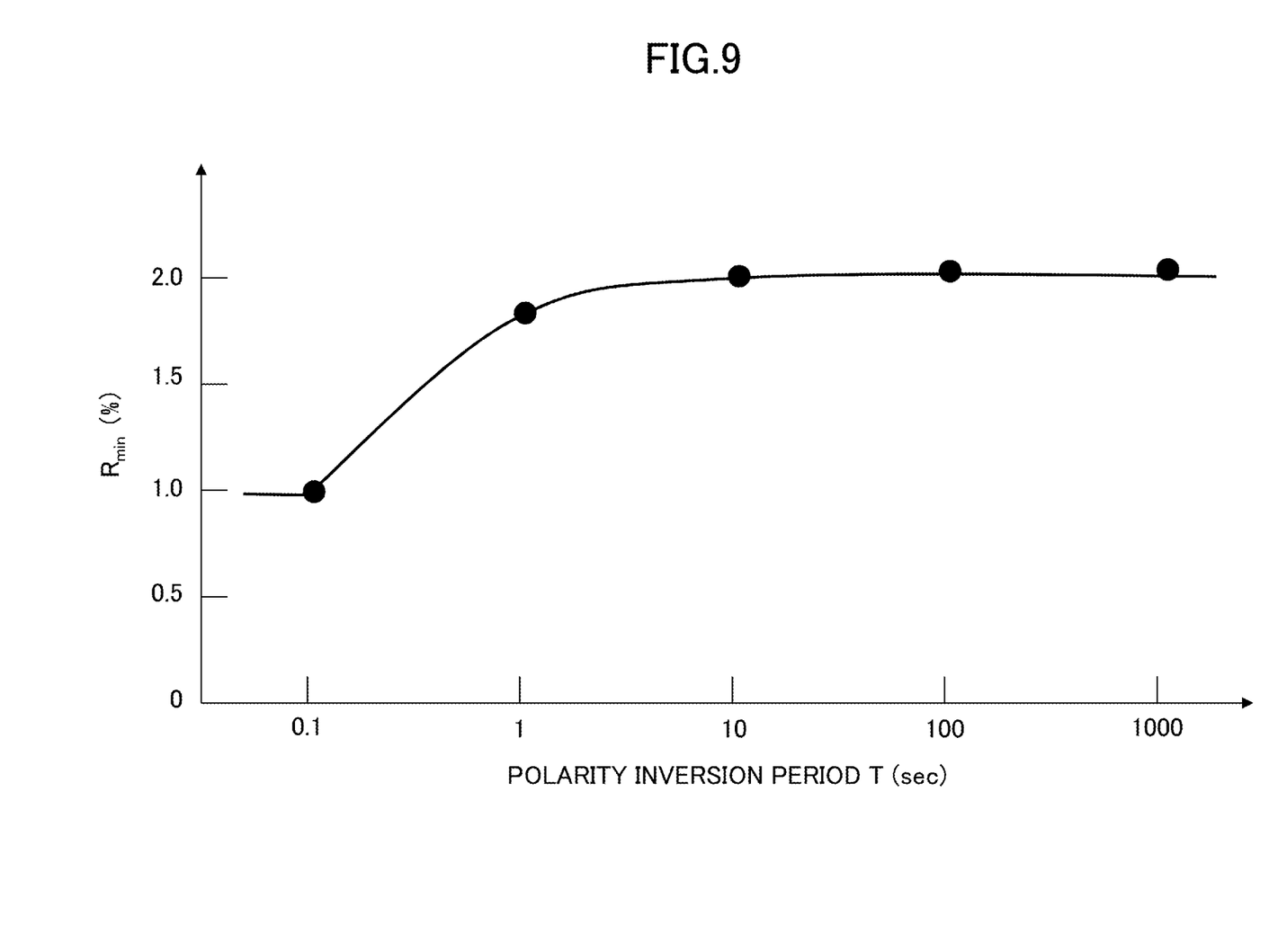
FIG. 9 is a graph showing a relation between a polarity inversion period and a minimum value of a flicker rate at which a research subject visually recognizes a flicker.

FIG. 9 is a graph (experimental data) showing a relation between a polarity inversion period T and the minimum value $R_{min}$ of the flicker rate R of flicker visually recognized by a research subject. The minimum value $R_{min}$ is defined as the smallest flicker rate R of the visually recognized flicker when two or more research subjects recognize flicker among five research subjects.

As shown in FIG. 9, the minimum value $R_{min}$ is approximately the smallest value ($R_{min}$=1.0%) when the polarity inversion period T is 0.1 seconds. As the polarity inversion period T increases from 0.1 seconds, the minimum value $R_{min}$ also rises. However, when the polarity inversion period T exceeds 1 second, a rate of change of the minimum value $R_{min}$ decreases. When the polarity inversion period T exceeds 10 seconds, the minimum value $R_{min}$ becomes constant at about 2%. This is because even if the research subject performs observation by staring at the polymer dispersion type liquid crystal panel 110, the research subject may blink the eyes for more than 10 seconds, for example, and may not be concerned about flicker occurring on the polymer dispersion type liquid crystal panel 110.

Thus, the polarity inversion period T is preferably 1 second or more. In order to set the polarity inversion period T to be 1 second or more, the frequency of the switching signal may be 0.5 Hz or less. Moreover, the polarity inversion period T is preferably greater than or equal to 1 second and less than or equal to 2 hours, as a practical range. Moreover, the polarity inversion period T is more preferably greater than or equal to 1 second and less than or equal to 1 hour, and further preferably greater than or equal to 1 second and less than or equal to 30 minutes.

Figure 10:
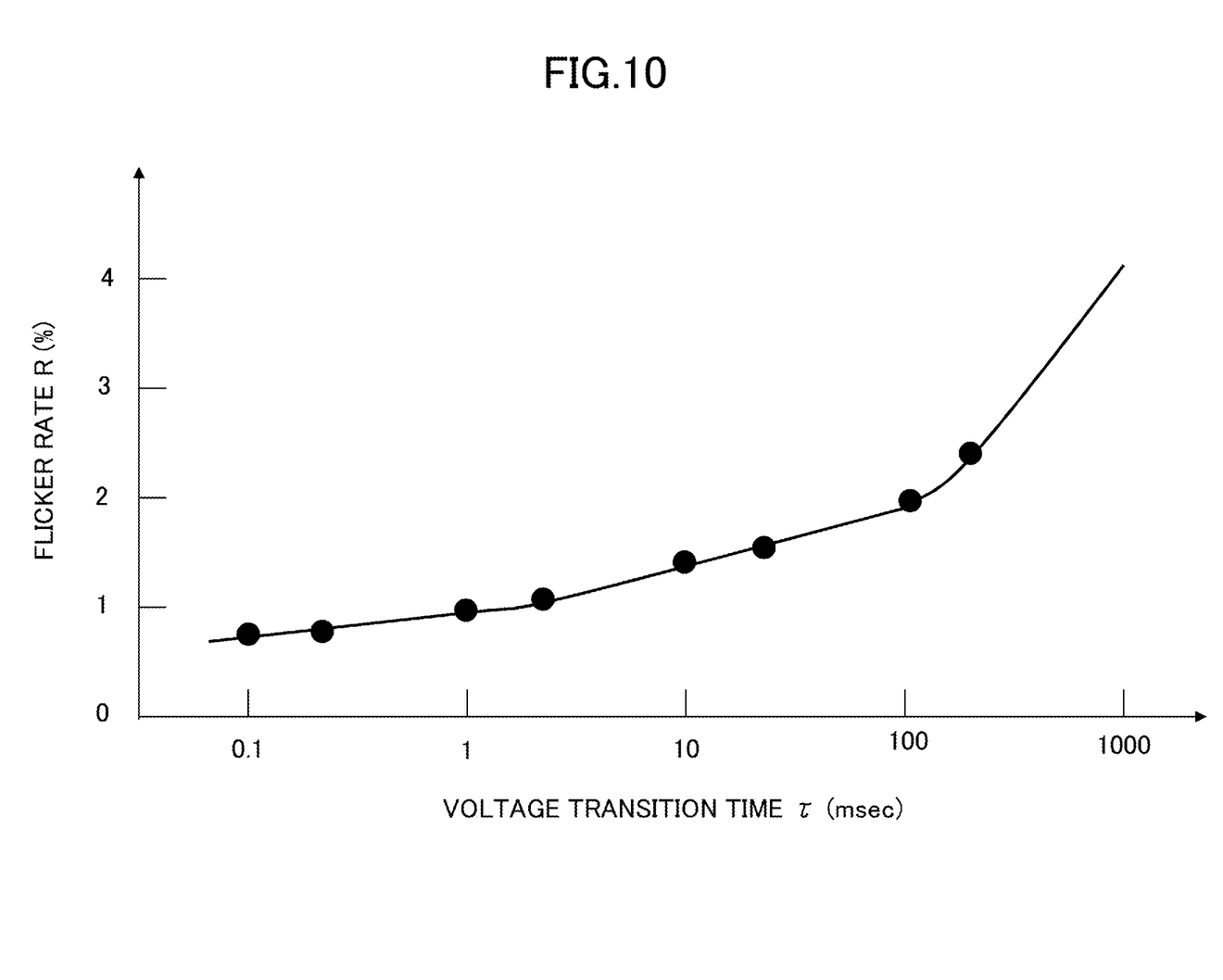
FIG. 10 is a graph showing a relation between the flicker rate and a voltage transition time.

FIG. 10 is a graph (experimental data) showing a relation between the flicker rate R and the voltage transition time τ. As shown in FIG. 10, as the voltage transition time τ increases, the flicker rate R becomes greater. Moreover, FIG. 10 also shows that a rate of increase of the flicker rate R is approximately constant when the voltage transition time τ is less than 100 milliseconds, and when the voltage transition time τ exceeds 100 milliseconds, the rate of increase of the flicker rate R increases. The flicker rate R is about 2% when the voltage transition time τ is 100 milliseconds.

As shown in FIG. 9, the flicker rate R is preferably suppressed to 2% or less so that the flicker is not visually recognized. As shown in FIG. 10, in order to suppress the flicker rate R to 2% or less, the voltage transition time τ may be set to 100 milliseconds or less. The voltage transition time τ is more preferably 50 milliseconds or less, and further preferably 20 milliseconds or less.

Moreover, in order to set the voltage transition time T to 100 milliseconds or less, the time constant of each of the first current limitation circuit 142 and the second current limitation circuit 144 is preferably 100 milliseconds or less.

As shown in FIG. 8(E), at the time of inverting the polarity, a large current change occurs in each of the first transparent electrode and the second transparent electrode due to a spike-like current (rush current) flowing in the electrode. The above-described current change is suppressed by the first current limitation circuit 142 and the second current limitation circuit 144.

Figure 11:
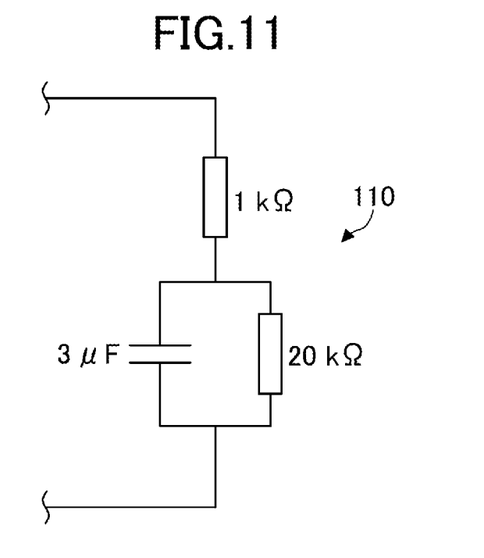
FIG. 11 is a diagram depicting an example of an equivalent circuit of the polymer dispersion type liquid crystal panel.

FIG. 11 is a diagram depicting an example of an equivalent circuit of the polymer dispersion type liquid crystal panel 110. A capacitance value and a resistance value shown in FIG. 11 are values when one side of the polymer dispersion type liquid crystal panel 110 is set to 1 meter (area is 1 m²). Then, a time constant of the equivalent circuit is 3 milliseconds. In this case, with a current of 100 mA, the first transparent electrode and the second transparent electrode can be activated to 100 V in 10 milliseconds.

Thus, the maximum current values $I_{max}$ of the first current limitation circuit 142 and the second current limitation circuit 144 are preferably 100 mA or less. Moreover, the maximum current values $I_{max}$ are more preferably 80 mA or less, and further preferably 60 mA or less.

(Power Consumption)

Next, the power consumption of the polymer dispersion type liquid crystal panel 110 will be described. TABLE 1 illustrates dependency of the power consumption on the polarity inversion period T.

TABLE 1

|  | Polarity inversion period T | Power consumption (w/m²) |
| --- | --- | --- |
| Practical examples | 1 second | 0.7 |
|  | 10 seconds | 0.5 |
|  | 100 seconds | 0.5 |
| Comparative example | Sine wave (60 Hz) | 17 |

In TABLE 1, calculation values of the power consumption calculated for a plurality of polarity inversion periods T based on the equivalent circuit shown in FIG. 11 are listed. TABLE 1 shows that as the polarity inversion period T increases, the power consumption decreases. However, the power consumption tends to become saturated when the polarity inversion period T is greater than or equal to 10 seconds.

Moreover, TABLE 1 also shows the power consumption in the case where the first transparent electrode and the second transparent electrode are driven by an alternating current voltage of the sine wave with the frequency of 60 Hz, as a comparative example. When the rectangular shaped direct current voltage is used, as in the embodiment of the present disclosure, the power consumption is found to be greatly smaller than that of the comparative example. In addition, with the decrease in the power consumption, the driving time of the polymer dispersion type liquid crystal device 10 can be made longer.

(Variation)

Next, variation of the embodiment of the present disclosure will be described.

In the embodiment of the present disclosure, as shown in FIG. 3, the external shape of the polymer dispersion type liquid crystal panel 110 is substantially square. However, the shape of the polymer dispersion type liquid crystal panel 110 is not limited to this, and may be appropriately changed.

Figure 12:
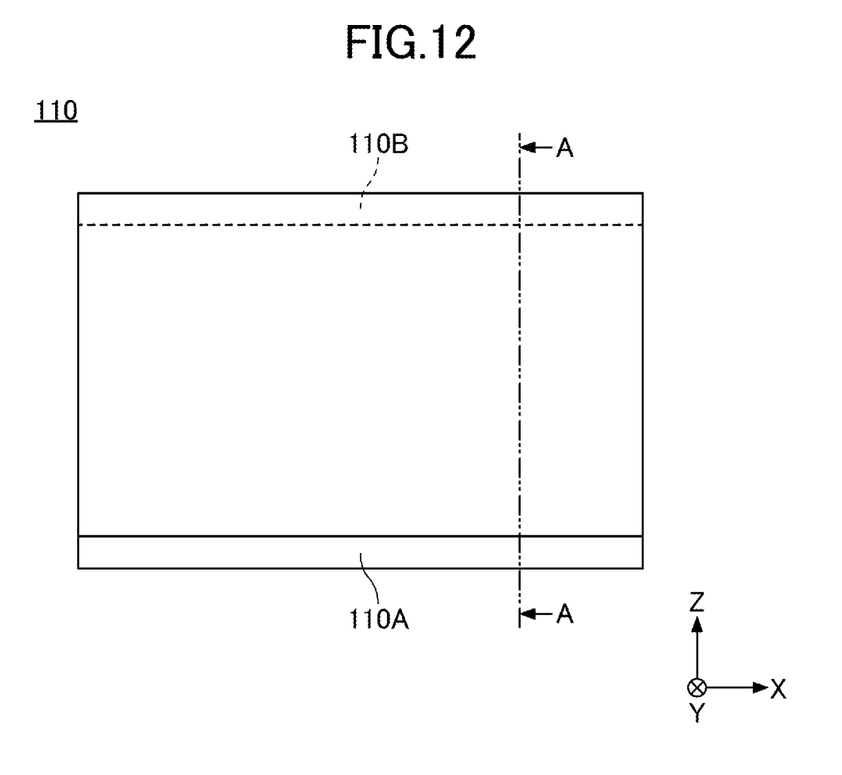
FIG. 12 is a diagram depicting an example of a polymer dispersion type liquid crystal panel according to a variation.
Figure 13:
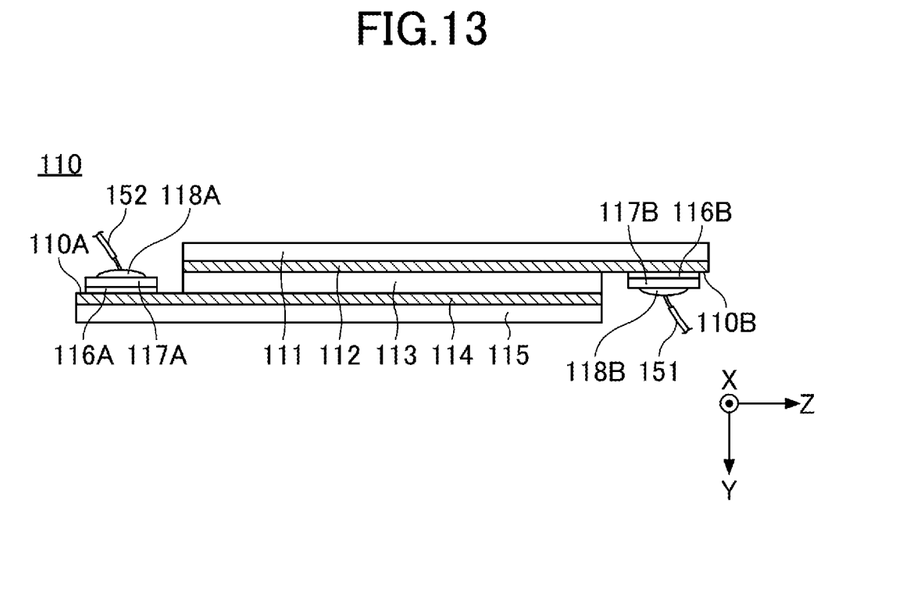
FIG. 13 is an A-A cross-sectional view of the polymer dispersion type liquid crystal panel shown in FIG. 12.

FIG. 12 is a diagram illustrating an example of the polymer dispersion type liquid crystal panel 110 having a rectangular external shape. FIG. 13 is an A-A cross-sectional view of the polymer dispersion type liquid crystal panel 110 shown in FIG. 12.

As shown in FIG. 12, in the polymer dispersion type liquid crystal panel 110 according to the variation, a side parallel to the X-direction is a long side, and a side parallel to the Z-direction is a short side. In the case where the polymer dispersion type liquid crystal panel 110 has a rectangular external shape, the first exposure portion 110A and the second exposure portion 110B are preferably formed at positions along a long side direction and opposite each other in a short side direction.

As shown in FIG. 13, by connecting the driving circuit 140 to the first exposure portion 110A and the second exposure portion 110B, which are formed along the long sides, via the wirings 151 and 152, it is possible to suppress the concentration of electric currents occurring at the time of inverting the polarity of the driving voltage.

In the above-described embodiment of the present disclosure, the voltage transition time τ at the time of inverting the polarity of the driving voltage is set according to the time constants of the first current limitation circuit 142 and the second current limitation circuit 144. However, the voltage transition time τ may be set by a CR circuit or the like that is separately provided.

In addition, the circuit configuration of the first current limitation circuit 142 and the second current limitation circuit 144 shown in FIG. 7 is merely an example. Other circuit configurations using diodes or the like may be used for the first current limitation circuit 142 and the second current limitation circuit 144.

Moreover, in the above-described embodiment of the present disclosure, for the polymer dispersion type liquid crystal panel, a normal type polymer dispersion type liquid crystal that becomes in a transparent state when a voltage is applied, and in a scattering state when the voltage is not applied has been employed. However, a reverse type polymer dispersion type liquid crystal having a different property, i.e. becoming in a scattering state when a voltage is applied and in a non-scattering state when the voltage is not applied, may also be employed.

As described above, preferred embodiments of the present invention have been described in detail. The present invention is not limited to the embodiments or the like. Various variations and replacements may be made for the above-described embodiments without departing from the scope of the present invention.

The present application claims the priority based on Japanese Patent Application No. 2019-042358 filed with the Japan Patent Office on Mar. 8, 2019, and the entire content of Japanese Patent Application No. 2019-042358 is incorporated herein by reference.

REFERENCE SIGNS LIST

10 Polymer dispersion type liquid crystal device
20 Window
22 Sash
24 Window glass
110 Polymer dispersion type liquid crystal panel
110A First exposure portion
110B Second exposure portion
111 Transparent substrate
112 Transparent electrode
113 Liquid crystal layer
114 Transparent electrode
115 Transparent substrate
116A, 116B Silver paste layer
117A, 117B Copper foil layer
118A, 118B Solder
120 Frame
130 Battery
140 Driving circuit
141 Booster circuit
141A First booster circuit
141B Second booster circuit
142 First current limitation circuit
143 Switching circuit
143A First switch
143B Second switch
144 Second current limitation circuit
145 Low drop-out regulator (LDO)
146 Clock circuit (CLK)
147 Divider circuit
147A First divider circuit
147B Second divider circuit
148 Connection terminal
151 Wiring
152 Wiring

The invention claimed is:

1. A polymer dispersion type liquid crystal device comprising:
a pair of transparent substrates;
a pair of transparent electrodes provided between the pair of transparent substrates;
a liquid crystal layer formed by filling a polymer dispersion type liquid crystal between the pair of transparent electrodes; and
a driving circuit that applies a voltage between the pair of transparent electrodes to set the liquid crystal layer to a non-scattering state or a scattering state, wherein
the driving circuit applies a direct current voltage that periodically inverts a polarity between the pair of transparent electrodes,
wherein
a voltage transition time at the time of inverting the polarity is 100 milliseconds or less, and
a flicker rate of a flicker occurring at the time of inverting the polarity is 2% or less.

2. The polymer dispersion type liquid crystal device according to claim 1, wherein
a period of inverting the polarity is one second or more.

3. The polymer dispersion type liquid crystal device according to claim 1, wherein
the driving circuit includes a current limitation circuit that limits a current flowing in the pair of transparent electrodes.

4. The polymer dispersion type liquid crystal device according to claim 3, wherein
the current limitation circuit limits the current flowing in the pair of transparent electrodes to 100 mA or less.

5. The polymer dispersion type liquid crystal device according to claim 4, wherein
the current limitation circuit has a time constant of 100 milliseconds or less.

6. A method of driving a polymer dispersion type liquid crystal panel that includes
a pair of transparent substrates;
a pair of transparent electrodes provided between the pair of transparent substrates; and
a liquid crystal layer formed by filling a polymer dispersion type liquid crystal between the pair of transparent electrodes, the method comprising:
applying a direct current voltage that periodically inverts a polarity between the pair of transparent electrodes, to set the liquid crystal layer to a non-scattering state or a scattering state,
wherein
a voltage transition time at the time of inverting the polarity is 100 milliseconds or less and
a flicker rate of a flicker occurring at the time of inverting the polarity is 2% or less.

* * * * *